United States Patent [19]
Gunter

[11] Patent Number: 5,937,489
[45] Date of Patent: Aug. 17, 1999

[54] ATTACHING CLIP FOR STABILIZING CENTER PIVOT IRRIGATION DROP TUBES

[76] Inventor: Uil L. Gunter, HCR 2 Box 27, Olton, Tex. 79064

[21] Appl. No.: 08/991,190

[22] Filed: Dec. 16, 1997

Related U.S. Application Data

[62] Division of application No. 08/546,951, Oct. 23, 1995, Pat. No. 5,779,163.

[51] Int. Cl.[6] ........................................ F16B 7/00
[52] U.S. Cl. ........................... 24/459; 24/129 R; 24/71.1; 403/397
[58] Field of Search ............................ 24/459, 455, 570, 24/563, 68 F, 129 R, 129 B, 910, 71.1; 248/58, 51; 242/388.4, 388.2; 403/392, 397, 400

[56] References Cited

U.S. PATENT DOCUMENTS

| | | | |
|---|---|---|---|
| 504,157 | 8/1893 | Foster | 403/397 |
| 598,342 | 2/1898 | Hawkins | 24/129 R X |
| 609,369 | 8/1898 | Robinson | 403/397 |
| 822,994 | 6/1906 | Shuflin et al. | 403/392 |
| 862,082 | 7/1907 | Lewis | 24/129 R X |
| 1,161,559 | 11/1915 | Weigel | 24/570 |
| 1,197,534 | 9/1916 | Norton . | |
| 1,423,211 | 7/1922 | Gushwa | 24/71.1 |
| 1,469,112 | 9/1923 | Schoonover | 24/910 X |
| 2,338,747 | 1/1944 | Waldheim | 24/71.1 X |
| 2,452,175 | 10/1948 | Atkins | 24/129 R X |
| 2,840,879 | 7/1958 | Boice | 24/570 |
| 2,893,643 | 7/1959 | Gordon | 239/177 |
| 2,941,727 | 6/1960 | Zybach | 239/177 |
| 3,055,686 | 9/1962 | Havener | 403/397 X |
| 3,353,751 | 11/1967 | Dowd | 239/177 |
| 3,445,066 | 5/1969 | Mohar | 239/189 |
| 3,648,930 | 3/1972 | Brown et al. | 239/156 |
| 3,653,400 | 4/1972 | Coates | 137/344 |
| 3,669,355 | 6/1972 | Jurgens | 239/177 |
| 3,870,235 | 3/1975 | Newell | 239/177 |
| 4,397,421 | 8/1983 | Schram | 239/177 R |
| 4,763,836 | 8/1988 | Lyle et al. | 239/69 |

Primary Examiner—James R. Brittain
Assistant Examiner—Robert J. Sandy
Attorney, Agent, or Firm—Jacobson, Price, Holman & Stern, PLLC

[57] ABSTRACT

A center pivot irrigation system is provided with longitudinally spaced drop tubes including flexible lower end portions for dragging upon the ground and an elongated low height tension member is tensioned between adjacent towers with structure by which the lower end portions of the drops may be clamped to the tension member.

14 Claims, 3 Drawing Sheets

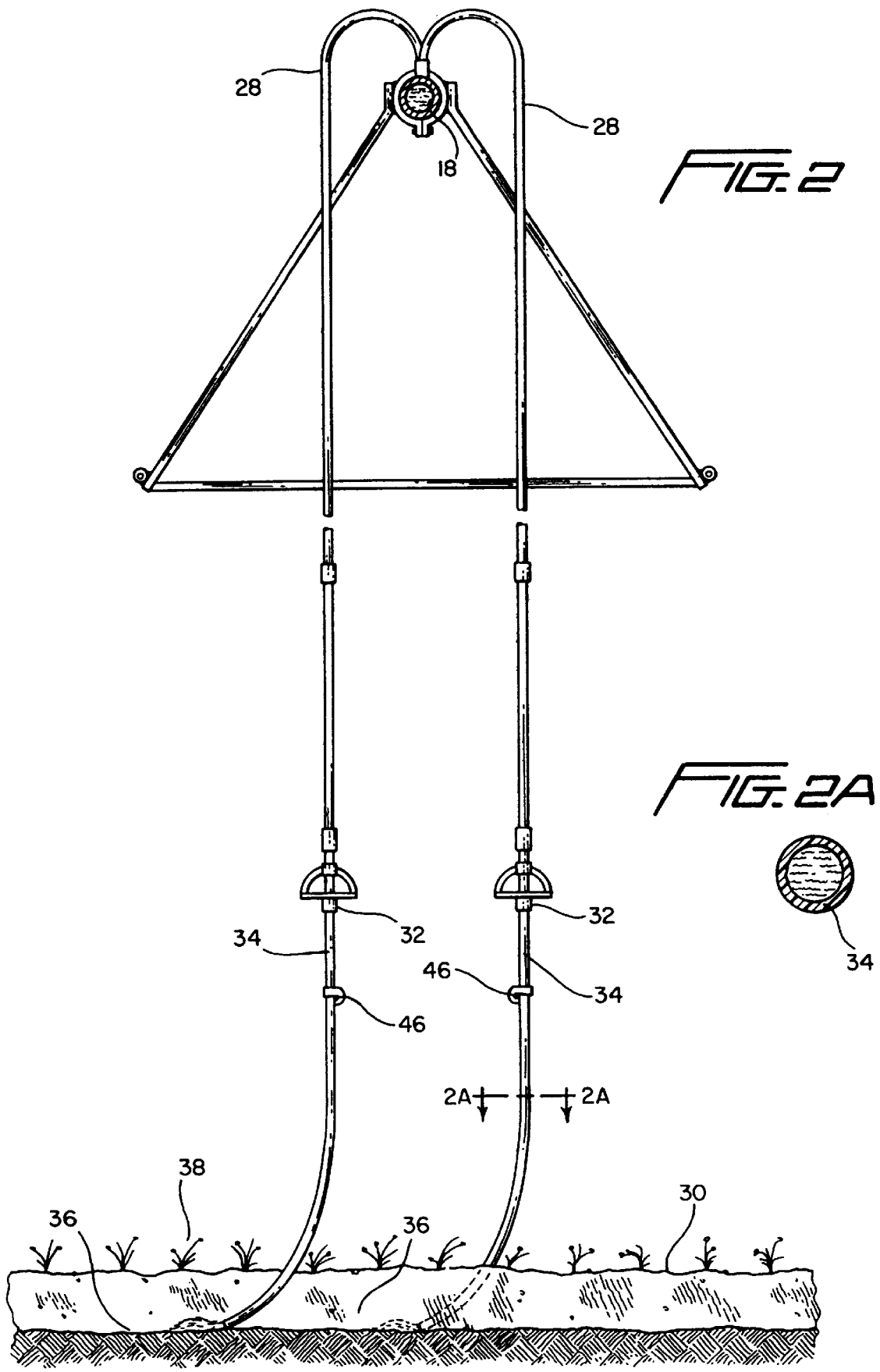

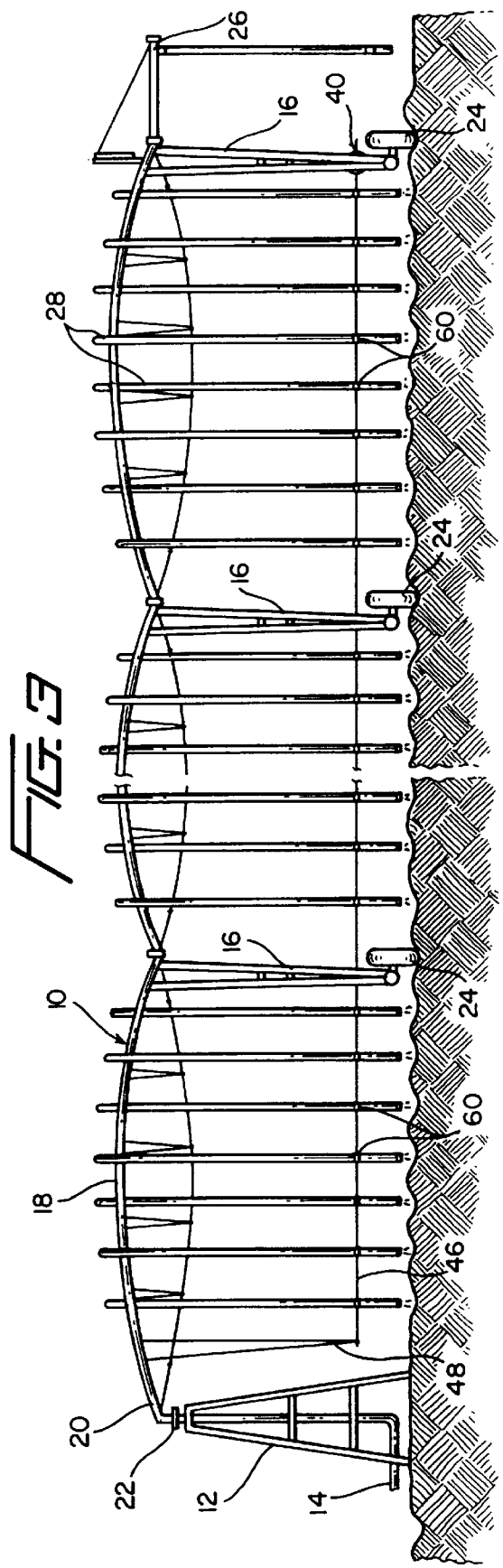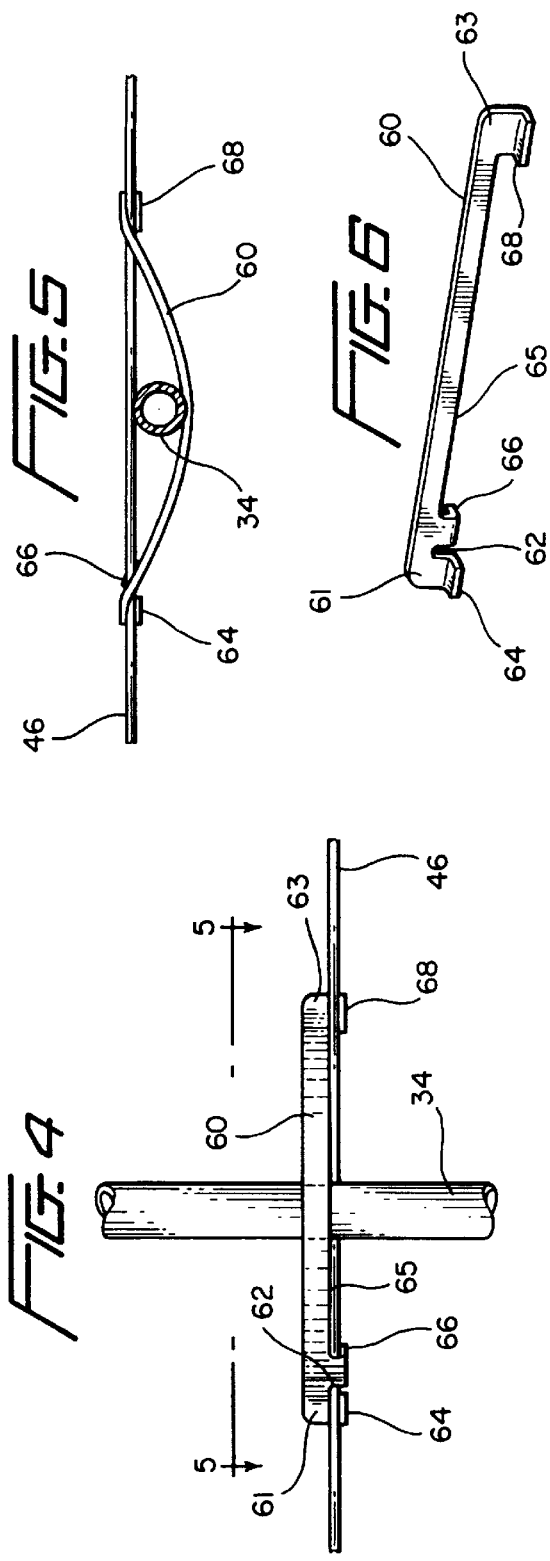

5,937,489

ATTACHING CLIP FOR STABILIZING CENTER PIVOT IRRIGATION DROP TUBES

This is a divisional of application Ser. No. 08/546,951 filed Oct. 23, 1995, now U.S. Pat. No. 5,779,163, issued Jul. 14, 1998.

BACKGROUND OF THE INVENTION

1. Field of the Invention

An elongated, horizontal adjustable height stabilizer extends between adjacent towers of a center pivot irrigation system and releasable anchor structure is utilized to releasably anchor the lower end portions of drop tubes of the irrigation system to the stabilizer. When a pair of laterally spaced stabilizers are provided the latter also serve to protect the center drive motor at each tower from being rubbed by livestock.

2. Description of Related Art

Various different forms of travelling irrigation systems including center pivot irrigation systems heretofore have been provided and many of these previously known systems include general structural features of a typical center pivot irrigation system with which the instant invention has been designed to be used.

Examples of these previously known irrigation systems are disclosed in U.S. Pat. Nos. 1,197,534, 2,893,643, 2,941,727, 3,353,751, 3,653,400, 3,445,066, 3,669,155, 3,870,235, 4,397,421 and 4,763,836. However, these previously known devices are not specifically designed to accomplish "low energy precision application" of irrigation water and further do not incorporate flexible hoses or "drops" which extend downward from the main line of the system to a low level spray body or emitter at or near ground level and, accordingly, do not encounter difficulty in precision application of irrigation water because of lateral deflection of the "drops" due to windy conditions, or irregularities in crop row placement.

SUMMARY OF THE INVENTION

The stabilizer of the instant invention has been specifically designed to be used in conjunction with center pivot irrigation systems in use to irrigate concentric circular crop rows made in confirmation with the center pivot irrigation pattern.

Center pivot irrigation systems of this type include long depending flexible hoses or "drops" which depend downward from the main line or delivery pipe of the system extending between adjacent support towers of the system and the drops terminate downwardly in removable flexible tubes or hoses whose lower ends drag upon the ground in the furrows between adjacent rows of crops.

This type of center pivot irrigation system requires considerably less power to drive the pump thereof, inasmuch as high water pressure is not required for a multitude of sprinkler heads, and the water discharged from the lower ends of the "drops" is deposited directly upon the ground in the furrows between adjacent rows of crop. This of course eliminates the loss of all of the water discharged from a spray head which normally evaporates before reaching the ground and further eliminates approximately one half of water loss due to evaporation of water from damp ground surfaces, the only ground surfaces being dampened by water being discharged from the "drops" being the ground surfaces in the furrows between adjacent rows.

Because of the substantially reduced power requirement, the prevention of evaporation of airborne, water and the prevention of evaporation of water from crop foliage and the ground in the crop rows, irrigation of a given acreage is carried more effectively and at a lower cost.

In addition, the "drops" are spaced forward of the leading side of the irrigation system as well as rearward of the trailing side of the irrigation system and the stabilizer incorporates tensioned stabilizer wires or the like which are laterally spaced apart to the leading and trailing sides of the irrigation system. The lower end portions of the drops are anchored to the stabilizer wires for stabilizing purposes. These stabilizing wires are anchored to adjacent towers of the irrigation system on opposite sides of the drive motors for the towers and therefore further serve to prevent live stock from "rubbing" the drive motors of the support towers.

The main object of this invention is to provide a stabilizing system for the "drops" of a "low energy precision application" type center pivot sprinkler system.

Another object of this invention is to provide a stabilizer system which will also function as a barrier to prevent livestock from "rubbing" the drive motor assembly of the wheeled support towers of the irrigation system.

Still another object of this invention is to provide a stabilizer system which may be readily mounted upon an existing center pivot irrigation system.

Another important object of this invention is to provide a "drop" stabilizer system in accordance with the preceding objects and which may be readily adjusted in height so as to adapt the system for irrigating newly germinated crops as well as various crops at different intervals during their growing cycle.

A final object of this invention to be specifically enumerated herein is to provide a stabilizer system in accordance with the preceding objects and which will conform to conventional forms of manufacture, be of simple construction and easy to use so as to provide an apparatus that will be economically feasible, long lasting and relatively trouble free in operation.

These together with other objects and advantages which will become subsequently apparent reside in the details of construction and operation as more fully-hereinafter described and claimed, reference being had to the accompanying drawings forming a part hereof, wherein like numerals refer to like parts throughout.

BRIEF DESCRIPTION OF THE DRAWINGS

FIG. 2 is an enlarged fragmentary vertical sectional view taken substantially upon the plane indicated by the section line 2—2 of FIG. 1;

FIG. 2A is a further enlarged horizontal sectional view taken substantially upon the plane indicated by the section line 2A—2A of FIG. 2;

FIG. 3 is a fragmentary, schematic side elevational view of the center pivot irrigation system illustrated in FIG. 1;

FIG. 4 is a fragmentary enlarged side elevational view illustrating the manner in which a spring-type strip is utilized to removably anchor an individual drop tube to one of the stabilizing wires of the stabilizing system;

FIG. 5 is a horizontal sectional view taken substantially upon the plane indicated by the section line 5—5 of FIG. 4;

FIG. 6 is a perspective view of the spring-type anchoring strip illustrated in FIGS. 4 and 5.

DETAILED DESCRIPTION OF THE INVENTION

Figure 1:
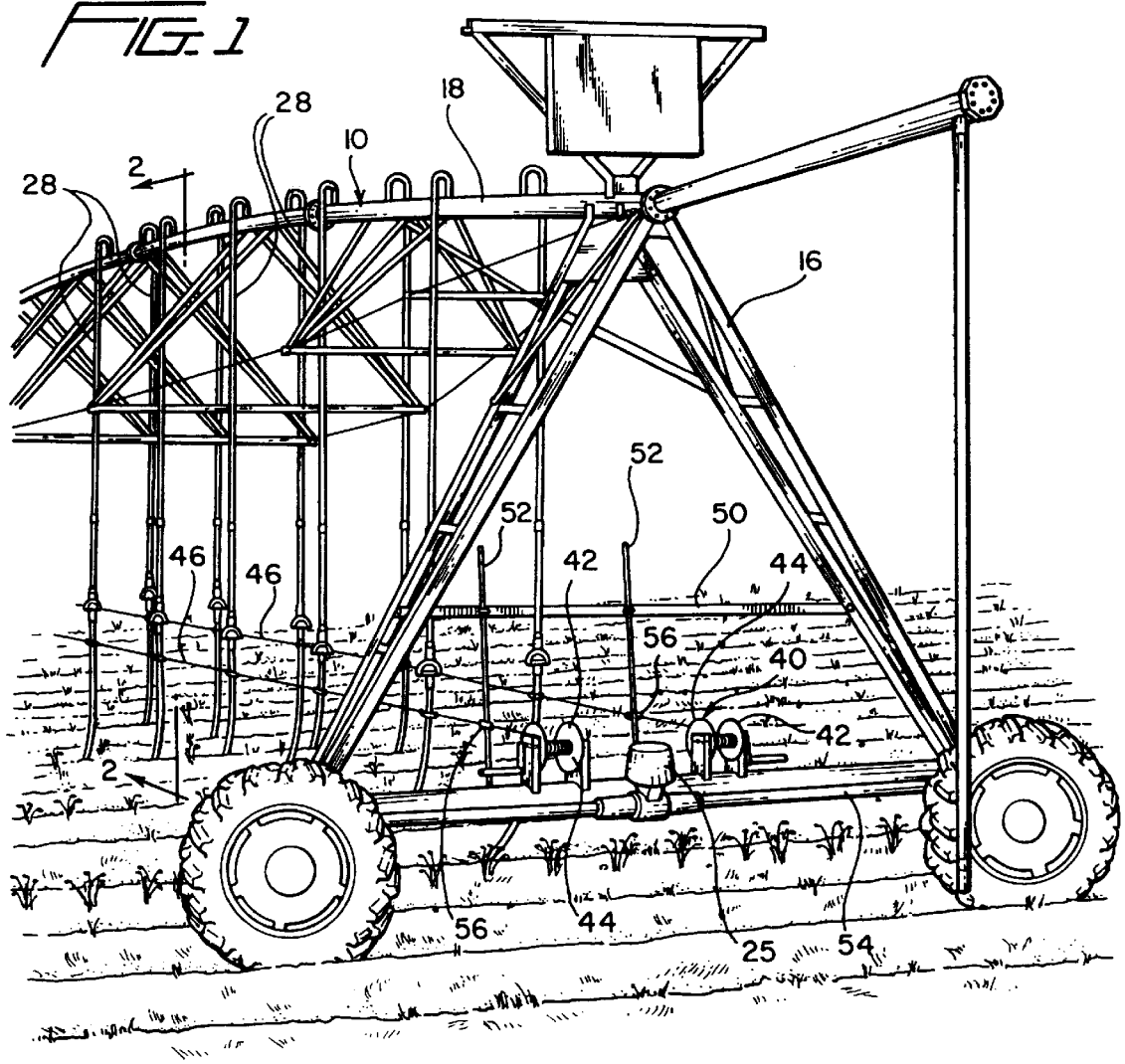
FIG. 1 is a fragmentary perspective view of the radially outermost end of a typical center pivot irrigation system with which the drop tube stabilizer assembly of the instant invention has been operatively associated.

Referring now more specifically to the drawings the numeral 10 generally designates a center pivot irrigation system including a center stationary tower 12 to which water is supplied through a supply pipe 14 from an adjacent well (not shown). The system 10 incorporates a plurality of wheeled support towers 16 supporting longitudinally spaced portions of an elevated delivery pipe 18 including an inlet end 20 coupled to the supply pipe 14 through a rotary coupling 22.

Figure 7:
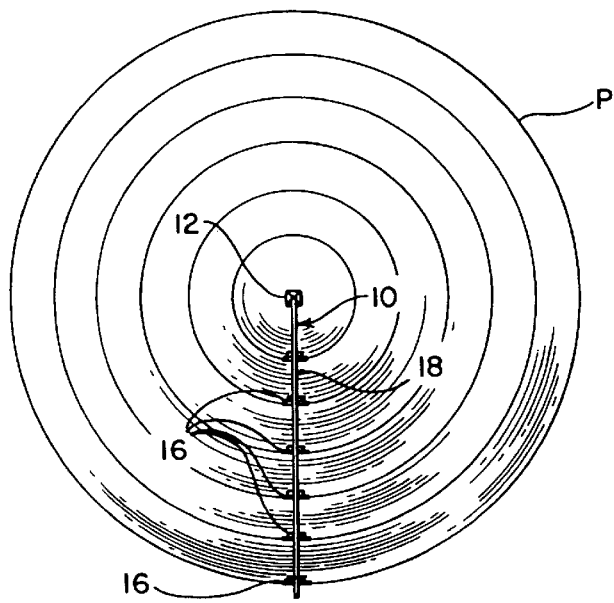
FIG. 7 is a top plane view of a farm field with which a center pivot irrigation system is in use and illustrating the manner in which the crop rows are formed in concentric circles conforming to the circular pattern of the irrigation system.

The support wheels 24 of the towers 16 are driven by motors 25 which may be either water powered or electrically powered and the system 10 includes controls (not shown) for these motors that maintain the towers 16 aligned along a radius of a circular pattern P having the tower 12 at its center, see FIG. 7.

The end of the delivery pipe 18, remote from the tower 12 includes a dump valve assembly 26 which may be manually or automatically opened at timed intervals in order to flush the delivery pipe of accumulated sand and other foreign materials collecting therein from the aforementioned well.

Conventionally, drop pipes or tubes 28 open outwardly of the delivery pipe 18 at points spaced longitudinally therealong and depend downwardly toward the agricultural field 30 over which the towers move. The drop pipes or tubes 28 open outwardly of the delivery pipe 18 at the upper periphery thereof to reduce the possibility of sand within the delivery pipe 18 passing upwardly into the drop pipes or tubes 28 and the tubes 28 extend downwardly to midheight couplers 32 from which spray heads may be mounted. However, in the instant situation, the spray heads have been eliminated and the drop pipes or tubes 28 have been provided with flexible lower end portions 34 which extend down to and contact the ground comprising the agricultural field 30 in a manner such that the lower terminal ends of the lower end portions 34 are deflected rearwardly in relation to the direction of movement of the delivery pipe or tube 18 and track in the circular furrows defined between adjacent rows of the crop 38 being grown in the field 30.

By utilizing the drop pipes or tubes 28 and the downwardly extending lower end portion 34 thereof, the water discharged from the delivery pipe 18 into the drop pipes or tubes 28 is deposited directly upon the ground in the furrows 36 between adjacent rows of the crop 38. By this procedure, as opposed to mounting high pressure sprinkler heads at the couplers 32, all airborne evaporation of water is eliminated and only the furrows 36 of the field 30 are wetted. This of course also eliminates evaporation of water from soil along the crop rows and from the foliage of the crop 38 itself, substantially all of the water being used for irrigation purposes being allowed to soak downwardly into the ground to the roots of the crop 38.

This type of "low energy precision application" of water during an irrigation process requires less power (lower water pressure in the delivery pipe 18) and constitutes a considerable savings in water, which savings in water is particularly important during extended dry seasons when the water table might otherwise drop sufficiently to cause insufficient water to be available at the aforementioned well.

However, in agricultural are as in which high winds sometimes occur, such high winds may blow the lower ends of the drop pipes or tubes 28 as well as the lower end portions 34 sufficiently to deflect the latter out of position in relation to the furrows 36, which furrows 36 are initially formed throughout the pattern P in accordance with the spacing of the drop pipes or tubes 28 along the delivery pipe 18.

The foregoing may be considered as conventional structure presently in use at least in the southwest of the United States, in which area sustained winds of appreciable velocities as well as wind gusts of higher velocities occur.

When appreciable wind velocities occur in a direction which generally parallels the line of towers 16, the drop tubes 28 and especially the lower end portions 34 thereof may be blown from one furrow 36 into an adjacent furrow or even the second adjacent furrow with the result that some furrows 6 may receive three times the desired amount of water while the fu rows from which a pair of lower end portions 34 have been blown receive no water. Although, in this instance, the center pivot irrigation system still functions in a manner to prevent excess evaporation of water discharged thereby, some furrows do not receive sufficient water and the crops in the adjacent rows suffer for lack of water.

In order to assure that the lower end portions 34 will remain in the proper furrows 36, the stabilizer system of the instant invention has been designed.

The stabilizer system is referred to in general by the reference numeral 40 and incorporates a pair of hand actuated winch assemblies 42 on at least the radial outermost tower 16. Each winch assembly 42 includes a winding spool 44 to which one end of an elongated flexible tension member such as a length of wire 46 is anchored and the other end of each wire 46 is either anchored to the next inward tower 16 or to a depending support 48 (see FIG. 3) immediately adjacent the tower 12. In addition, at least the radial outermost tower 16 and support 48 each include a horizontal brace 50 and a pair of uprights 52 having their upper end portions anchored to the brace 50 and their lower end portions anchored to the lower horizontal member 54 of the radial outermost tower 16. The uprights 52 each include a clamp member 56 releasably mounted in adjusted height thereon and to which the corresponding tension member 46 is anchored.

If the tension members 46 are to extend only between adjacent towers 16 the ends of the tension members 46 remote from the spools or winding members 44 will be anchored to the uprights 52 on the next inward tower 16. On the other hand, if the tension members 46 are to extend between the outermost tower 16 and the brace 48, the brace 48 also will be provided with upright corresponding to the uprights 52 and clamps 56 mounted thereon to which the free ends of the tension members 46 may be anchored. However, intermediate length portions of the tension members 46 each will be supported at each tower 16 inward of the outermost tower 16 by clamps corresponding to the lamps 56.

The tension members 46 are disposed forward and rearward of the motors 25 in that the drop pipes or tubes 28 are alternately disposed forward and rearward of the delivery pipe 18. Thus, the drop pipes or tubes 18 extend vertically downwardly in alignment with the tension members 46 such that the lower end portions 34 are disposed closely alongside the tension embers 46.

In order to attach each lower end portion 34 to the corresponding tension member 46, an elongated resilient strap 60 is provided having opposite ends 61 and 63. The strap 60 is disposed in longitudinal edge upstanding position and the lower margin or edge 65 of the strap 60, adjacent one end 61 thereof, includes a downwardly opening notch 62 and lower margin oppositely horizontally laterally outwardly projecting flanges 64 and 66 on opposite sides of the slot 62. In addition, the other end 63 of the strap includes a lower margin horizon tally outwardly projecting flange 68 projecting laterally outwardly of the side of the strip 60 opposite to the side thereof outwardly of which the adjacent flange 66 projects.

With attention now invited more specifically to FIGS. 4, 5 and 6, each strip 60 is downwardly displaced relative to the corresponding tension member 46 such that the latter is upwardly received in the notch 62 and the strip 60 is then swung to a position generally paralleling the tension member 46 with the flanges 64 and 66 engaged under the tension member 46 from opposite sides thereof. The other end 63 of the strip 60 is then bowed over the side of the corresponding lower end portion 34 remote from the associated tension member 46 and engaged over the tension member 46 with the flange 68 passing beneath the tension member 46 from the side thereof opposite the side of the tension member 46 from under which the flange 66 is engaged. Thus, each drop lower end portion 34 is tightly held against the opposing side of the corresponding tension member 46.

When it is desired to raise the height of the tension members 46 due to the crop 38 reaching an elevation approaching the original height of the tension member 46, the strips 60 are removed, the tension on the tension members 46 is relieved and the clamps 56 are raised to the desired higher elevation. Then, the tension members 46 may be retensioned a id strips 60 may again be applied to each drop lower end portion 34 and the associated tension member 46.

When the tension members 46 and strips 60 (comprising attaching means for attaching the lower end portions 34 to the tension members 46) are in place, the lower end portions 34 of the drop pipes or tubes 28 are securely held in position against deflection by wind. Thus, the lower end portions 34 are each retained in the corresponding furrow 36 and a minimum amount of water is required to irrigate the crop 38.

In addition, the tension members 46 are disposed on opposite sides of the motors 25 utilized on the towers 16 and thus serve as barriers against the motors being "rubbed" by livestock. It is also pointed out that the clamps 56 may comprise insulator-type clamps, that the spools 44 may be constructed of dielectric material and that the tension members 46 ay comprise noninsulated electrically conductive wire with an electric fence electrical pulse generator electrically connected to the tension members 46 closely adjacent the tower 12, assuming that the tension members 46 each extend from the outermost tower 16 to the brace 48.

The foregoing is considered as illustrative only of the principles of the invention. Further, since numerous modifications and changes readily will occur to those skilled in the art, it is not desired to limit the invention to the exact construction and operation shown and described and accordingly, all suitable modifications may be resorted to, falling within the scope of the invention.

What is claimed as new is as follows:

1. An attaching strip for attaching relatively angulated, side-by-side elongated members to each other wherein one of said members is substantially thinner than the other member, said attaching strip comprising an elongated resilient one-piece member having opposite ends, opposite longitudinal sides and generally parallel edge margins, a narrow slot in one of said edge margins adjacent one end of said strip, said slot opening outwardly of said one edge margin, said one edge margin including a pair of generally perpendicular outwardly directed flanges on opposite sides of said slot, said one margin of said strip including a generally perpendicular third flange adjacent the other end of said strip, said third flange projecting laterally outwardly to the side of said strip opposite the side thereof to which the flange adjacent the near side of said slot projects, said slot adapted to receive said thinner member therein and said pair of flanges adapted to extend laterally of said thinner member in opposite directions outwardly of said slot, said third flange adapted to engage the thinner member, said third flange adapted to retain the other end of the strip adjacent the thinner member and said side-by-side members engaged when a central portion of said strip engages said other member in opposed relation to the thinner member.

2. The strip as described in claim 1, wherein said thinner member is a tension wire.

3. The strip as described in claim 2, wherein said other member is a tube.

4. An attaching clip for securing a first elongated member to a second elongated member crossing said first member at a point of contact, said clip comprising a generally flat longitudinal resilient strip having interior and exterior sides and first and second longitudinally spaced ends, said first end including a slot opening on said strip adapted to receive and engage said first member and said second end including an engaging element adapted to secure the exterior side of said strip to said first member, a central area of the interior side of said strip between the slot and engaging element adapted to clamp and support said other member against said first member between said two ends.

5. The clip as described in claim 4, wherein said first end includes a first laterally extending flange projecting from the exterior side of said strip on one side of said slot opening and a second laterally extending flange projecting from the interior side of said strip on the other side of said slot opening, said first and second flanges securely engaging said first member, in said slot opening.

6. The clip as described in claim 5, wherein said first elongated member is a tension wire and said engaging element at said second end includes a third laterally extending flange projecting from the exterior side of said strip.

7. The clip as described in claim 6, wherein said flanges are each located along one longitudinal edge of said strip and project generally perpendicularly from the sides of said strip.

8. The clip as described in claim 7, wherein said flanges are adapted to engage said tension wire on a surface thereof in opposed relation to an inner end of said slot opening.

9. A removable clip for stabilizing a generally vertically depending water outlet drop tube against a generally horizontal tension wire extending along a series of such generally vertical water outlet drop tubes of a mobile irrigation device, wherein said tension wire is substantially thinner than said water outlet drop tubes, said removable clip comprising a generally flat longitudinal strip having interior and exterior sides, upper and lower longitudinal edges, and first and second longitudinally spaced ends on opposite sides of a middle portion, said first end including a generally vertical slot, said slot opening along said lower edge adapted to receive and engage said tension wire at a first location, said first end also including at least one laterally extending flange projecting from said exterior side of said strip adjacent one edge of said slot and projecting from said lower longitudinal edge adapted to hold said tension wire in said slot, said second end including another laterally extending flange projecting from said lower longitudinal edge and projecting from said exterior side of said strip adapted to engage said tension wire at a second spaced location, said longitudinal strip adapted to clamp and support said drop tube against said tension wire when the interior side of said middle portion of said strip engages said drop tube in opposed relation to an area of contact between said drop tube and tension wire when said tension wire is in said slot and said flanges engage said tension wire.

10. The clip as described in claim 9, wherein said first end includes an additional laterally extending flange projecting from said interior side adjacent another edge of said generally vertical slot.

11. The clip as described in claim 9, wherein said strip is resilient to assist in clamping said drop tube to said tension wire at their point of crossing.

12. The clip as described in claim 9, wherein the interior side of said middle portion of said strip is adapted to engage said drop tube and the exterior side of the strip adjacent the ends thereof is adapted to engage said tension wire on surfaces thereof opposed to clamping contact between said tension wire and drop tube.

13. A connecting assembly comprising a pair of generally rigid, angularly related elongate members oriented in side-by-side intersecting contact, a clip retaining said elongate members in side-by-side intersecting contact, said clip comprising a flexible resilient strip having a central portion engaged with one of said between said elongate members, said strip having remote ends engaged with the other of said elongate members at points in spaced relation to opposite sides of the contact area between said elongate members to bow the strip at the central portion thereof and bias said elongate members into intersecting contact, each of the remote ends of said strip including a surface area engaging said other elongate member in opposed relation to the intersecting contact area between said elongate members and opposite to the engagement area between the central portion of the strip and said one elongate member to bias said elongate members into intersecting contact, one end of said strip including a slot at one of said surface areas in contact with said other elongate member with the slot receiving said other elongate member to retain the strip engaged with said other elongate member, each of said surface areas on said strip being on a laterally extending flange with one of said flanges being located at a side of said slot, said flanges extending generally perpendicular to the strip and in underlying relation to said other elongate member to retain the strip in assembled relation to said elongate members, the end of said strip including the slot therein also having an additional flange extending laterally therefrom in generally perpendicular relation to the strip at one side of the slot and extending in opposite relation to the flange at the other side of the slot for extending under the other elongate member for anchoring the strip to the other elongate members with the central portion of the strip and the flanges at the and of the strip biasing said elongate members into intersecting contact.

14. The connecting assembly as defined in claim 13, wherein said strip is an elongated resilient one piece member having opposite longitudinal flat side surfaces and generally parallel edges, said slot including an inner end in spaced opposed relation to said surface areas on said flanges at the sides of the slot a distance generally equal to the major transverse dimension of said other elongate member whereby said flanges at the sides of the slot engage said other elongate member in opposed relation to the inner end of the slot thereby locking the other elongate member in the slot.

\* \* \* \* \*